Nov. 28, 1961   J. P. JORDAN   3,010,500
FOOD HOLDER AND CARVING AID
Filed March 17, 1958   2 Sheets-Sheet 1

INVENTOR.
John Philip Jordan
BY William F. Woods
attorney

Nov. 28, 1961          J. P. JORDAN          3,010,500

FOOD HOLDER AND CARVING AID

Filed March 17, 1958          2 Sheets-Sheet 2

INVENTOR.
John Philip Jordan
BY William F. Woode
Attorney

United States Patent Office 3,010,500
Patented Nov. 28, 1961

3,010,500
FOOD HOLDER AND CARVING AID
John Philip Jordan, Minneapolis, Minn., assignor of fifty percent to Hyland Industries, Minneapolis, Minn.
Filed Mar. 17, 1958, Ser. No. 721,794
1 Claim. (Cl. 146—216)

This invention relates generally to an improved type of holder; in particular it contemplates a novel means of solving a problem that has existed for quite some time, viz., the problem of securely restraining a roast or fowl with one hand while leaving the other hand free to carve the meat into smaller portions.

Prior efforts in household and cooking art have all been concerned with attempts at improving the well-known carving fork. While the state of the carving fork art has advanced to some degree it is still characterized by shortcomings inherent in the final product, usually a two-pronged fork having a pivoted thumb rest combined with a skewer to facilitate removal therefrom the meat. Any one familiar with meat carving is aware of the difficulty encountered by the use of long slender tines imbedded in a mass of loosely knit cooked meat. Besides the constant threat of having the meat fall apart completely, there is also the danger of forcibly contacting the underlying plate surface with the tines of the fork at an angle resulting in the unexpected presence of a roast or chicken in a diner's lap.

Accordingly, it is a broad object of the present invention to provide an improved means of holding food products;

Another primary object of the present invention is to provide an improved meat carving aid;

Still another object of the present invention is to provide a food holding and carving aid which is not only easy to manufacture but is also pleasing in exterior design and shape;

A further object of the present invention is to provide a meat holder and carving aid which grips the meat at numerous points to prevent shredding of the meat;

Another object of the present invention is to provide in a meat holder and carving aid means for insulating the hand and thumb from heat and from grease and the like encountered in cooked meats;

A still further object of the present invention is to provide a compact and easily cleaned meat holder;

Yet another object of the present invention is to provide a two-piece meat holder that can be easily held to provide a natural means of restraining roasts and the like from slipping;

Another object of the present invention is to provide a two-piece meat holder having a plurality of spurs for firmly gripping a piece of meat;

A further object of the present invention is to provide a meat holder and carving aid designed to effectuate its purpose with the least possible effort combined with the utmost safety;

Another object of the present invention is to provide finger and thumb engageable means for holding a piece of meat;

Another object of the present invention is to provide a two-pieced pronged food holder having finger and thumb engageable means and being connected together to provide a unitary structure.

Other objects and advantages of the invention will become apparent from the following detailed description taken in connection with the accompanying drawings in which is shown a preferred and an alternative embodiment of the invention by way of illustration only.

Turning now to a consideration of the drawings, and more particularly to FIGURES 1 to 8, it can be seen that the invention in its preferred form, consists of two elements, i.e., finger plate A and thumb plate B. FIGURES 1 to 4 illustrate the structural characteristics of plate A while FIGURES 5 to 8 include detailed views illustrating plate B. A third element, connecting plates A and B, while not shown, is within the purview of the invention and could consist of a plastic web, beaded chain, grease resistant nylon or some other heat and dirt resistant material suitable for securing elements A and B together. For the sake of simplicity and to reduce the invention to the least number of required parts, the exemplary embodiment thereof is shown without such a connecting piece.

Finger plate A as well as thumb plate B are preferably molded of a suitable heat resisting plastic material such as polymethyl styrene, melamine resin, melamine-phenolic laminates and the like. It is also apparent that plates A and B could be fabricated of metallic materials such as die cast aluminum and other readily formed alloys.

Figure 1:
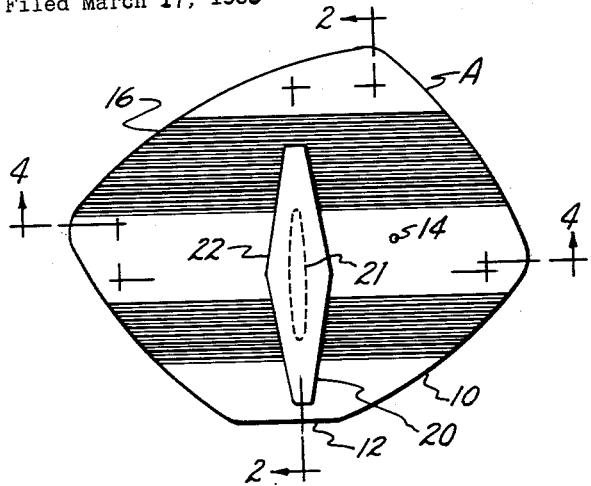
FIGURE 1 is a plan view of the preferred form of one of the elements of the invention.
Figure 2:
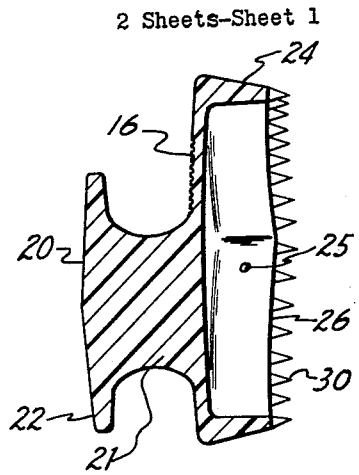
FIGURE 2 is a sectional view taken along the line 2—2 of FIGURE 1.
Figure 3:
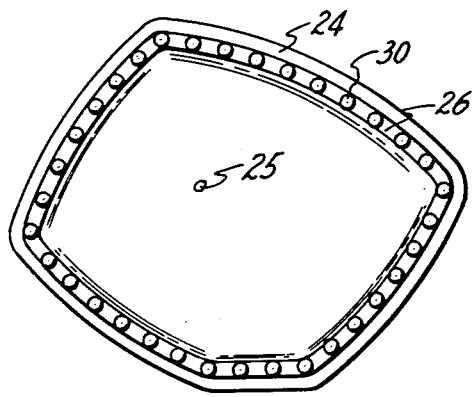
FIGURE 3 is a bottom view of the element shown in FIGURE 1.
Figure 4:
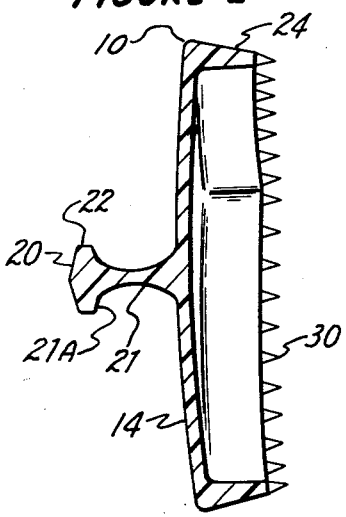
FIGURE 4 is a sectional view taken along the lines 4—4 of FIGURE 1.
Figure 5:
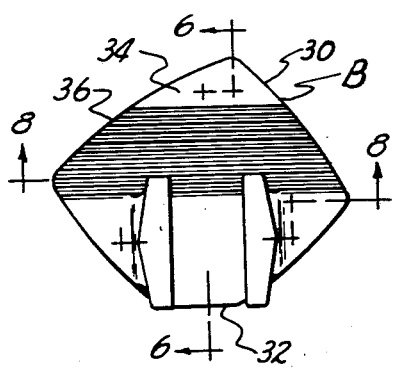
FIGURE 5 is a plan view of the preferred form of the other element of the invention.
Figure 6:
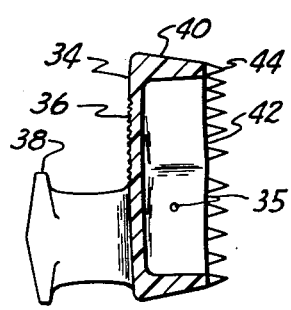
FIGURE 6 is a sectional view taken along lines 6—6 of FIGURE 5.
Figure 7:
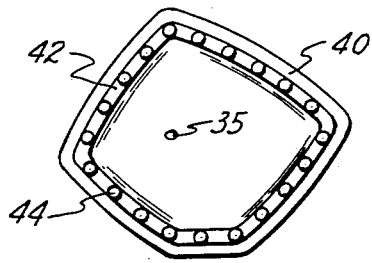
FIGURE 7 is a bottom view of the element shown in FIGURE 5.
Figure 8:
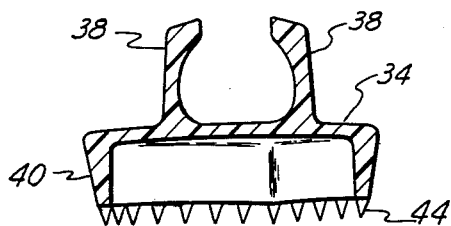
FIGURE 8 is a sectional view taken along lines 8—8 of FIGURE 5.

Finger plate A is characterized by a substantially oval shape as shown in FIGURE 1. The top edges 10 may be formed to resemble a series of connecting arcuate surfaces having a truncated lower portion 12. The top surface 14 has a slight crown (see FIGURE 4) and is scored with a series of parallel grooves 16 extending across the face thereof to provide a non-skid surface. Surface 14 is also large enough to protect the hand from a carving knife. Extending upwardly from top surface 14 and integral therewith is a handle 20 having a thin lower web section 21 terminating in an enlarged head portion 22. Handle 20 is located adjacent truncated portion 12 to provide suitable contact with the palm of the hand. Molded integrally with top surface 14 is a depending wall 24 extending downwardly from surface 14 at a slight angle as shown in FIGURES 2 to 4, and terminating in a horizontal annular shaped bottom surface 26. The lower portion of plate A is hollowed out as at 25 to provide the annular shaped surface 26 and to allow dissipation of heat as well as to facilitate the flow of meat juices, etc., therethrough.

Arranged in the center of annular surface 26 is a plurality of closely spaced cone-shaped spurs 30 integrally attached to surface 26 and depending downwardly therefrom in a vertical manner. The spurs 30 have relatively sharp points and may extend in the order of ⅛ to ¼ inch from surface 26. Ample space is left between adjacent spurs 30 to allow cleaning, the preferred distance between cone centers being around ¼ inch while the cone diameter at the intersection thereof with surface 26 is about 3/32 inch.

Handle 20 is preferably symmetrical about the longitudinal center line thereof. The head portion 22, which rests upon web 21 is located above surface 14 a distance sufficient to permit a finger to fit on each side of web 21 and under the lower surface 21A of head portion 22.

Thumb plate B, although similar in outline to finger plate A, is about one half the size of finger plate A. Its general features include arcuate edges 30 and a truncated lower edge 32. The top surface 34 thereof is substantially flat and is scored with a series of parallel grooves 36 similar to the grooves 16 in finger plate A. Means for engaging the thumb is provided integrally with top surface 34 consisting of a pair of inwardly curved complementary lugs 38 extending upwardly from surface 34. Lugs 38 are adapted to receive a thumb and are symmetrically positioned with respect to the center of thumb plate B.

Thumb plate B further includes a downwardly depending annular wall 40 inclined at a slight angle and terminating in horizontal annular bottom surface 42. A plurality of cone shaped spurs 44 identical in shape to those found in finger plate A are molded integrally with surface 42 to provide a gripping surface.

Lugs 38 are located adjacent edge 32 to allow thumb plate B to rest securely against the thumb in a manner similar to finger plate A. The bottom surface 35 of thumb plate B is recessed to provide insulation from the effects of heat and to allow the dissipation of meat juices therefrom.

Figure 9:
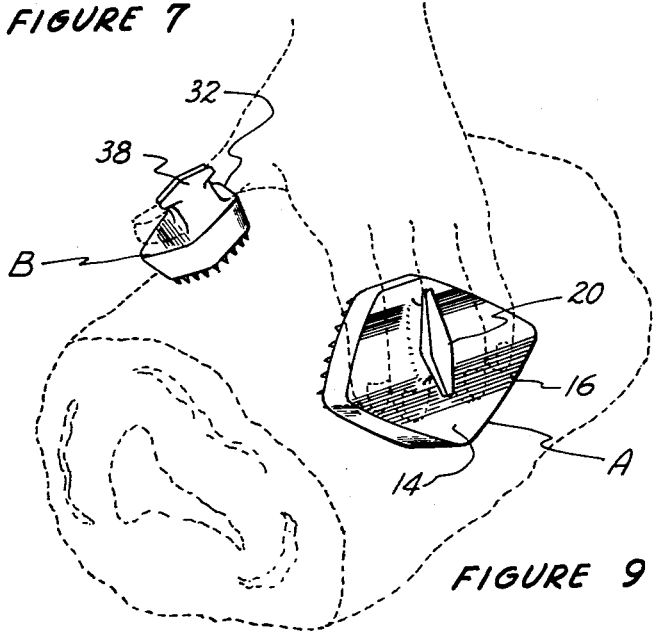
FIGURE 9 is a perspective view showing the preferred form of the invention in actual use.

FIGURE 9 illustrates the manner in which the preferred embodiment of the invention is put into operation. As shown, finger plate A is held by means of handle 20 between the third finger and the fourth finger with the truncated edge 12 resting against the palm of the hand. The lower surfaces of the fingers rest on the top surface 14 of plate A and are prevented from slipping by grooves 16. Thumb plate B is held through lugs 38 by the thumb of the hand with edge 32 thereof comfortably residing at the thumb joint.

The meat (a roast is shown) may then be firmly gripped between plates A and B without fear of slippage or shredding of the meat as it is cut. The latter is particularly important when the meat is well done or extremely tender.

It is also apparent that the invention may be used to turn meat over in the pan or to lift it bodily therefrom. In fact, any time large portions of meat are handled may present an opportunity to use the device.

Figure 10:
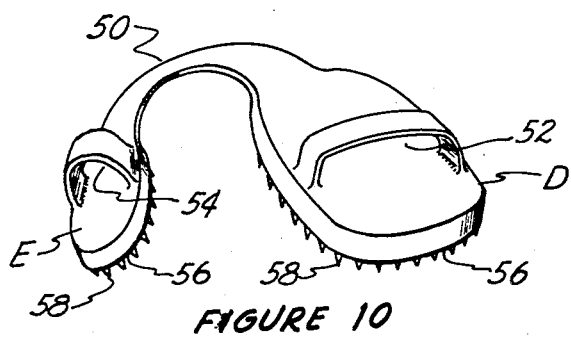
FIGURE 10 is a perspective view illustrating an alternative form of the invention.

The perspective view of FIGURE 10 shows an alternative form of the invention wherein a plastic finger piece D is provided which is connected by means of strap 50 to thumb piece E. In this form finger piece D and thumb piece E are formed with a finger slot 52 and a thumb slot 54 respectively. Their lower surfaces 56 have imbedded therein a plurality of spurs 58 similar to spurs 30 and 44 of the preferred embodiment. Spurs 58 may be of metal or they may be molded integrally with the body of pieces D and E.

While the device has been described in relation to its usefulness in holding meats during the carving thereof, it is of course understood that other uses are available. Without purporting to be exhaustive such uses could include eating corn on the cob, holding broiled lobsters, etc.

Although the invention has been described in its preferred form with a certain degree of particularity, it is to be understood that the present disclosure of the preferred form has been made only by way of example, and that numerous changes in the details of construction and the combinations and arrangements adverted to may be made without departing from the spirit and scope of the invention as hereinafter claimed.

I claim:

A meat holder consisting of a rigid body, a sharply defined generally vertical depending skirt integral with said body, said skirt having a lower surface substantially parallel with said body and forming therewith a recessed chamber beneath said body, said chamber having a well-defined inner wall and a ceiling, and a series of short spaced generally conical relatively sharp rigid spurs integral with and projecting from the lower surface of said skirt.

References Cited in the file of this patent

UNITED STATES PATENTS

| | | |
|---|---|---|
| 19,288 | Dickerman | Feb. 9, 1858 |
| 172,509 | Shepard | Jan. 18, 1876 |
| 1,417,619 | Male | May 30, 1922 |
| 1,765,623 | Ness | June 24, 1930 |
| 2,041,262 | Schweibold | May 19, 1936 |
| 2,177,397 | Woodrow | Oct. 24, 1939 |
| 2,496,062 | Morfesi | Jan. 31, 1950 |
| 2,607,064 | Sullivan et al. | Aug. 19, 1952 |
| 2,616,745 | Alston | Nov. 4, 1952 |

FOREIGN PATENTS

| | | |
|---|---|---|
| 7,516 of 1909 | Great Britain | Apr. 28, 1910 |
| 269,830 | Great Britain | Apr. 28, 1927 |
| 388,860 | Great Britain | Mar. 9, 1933 |